May 5, 1936.  R. RUPERT  2,039,933
AUTOMATIC FAUCET
Filed June 18, 1935
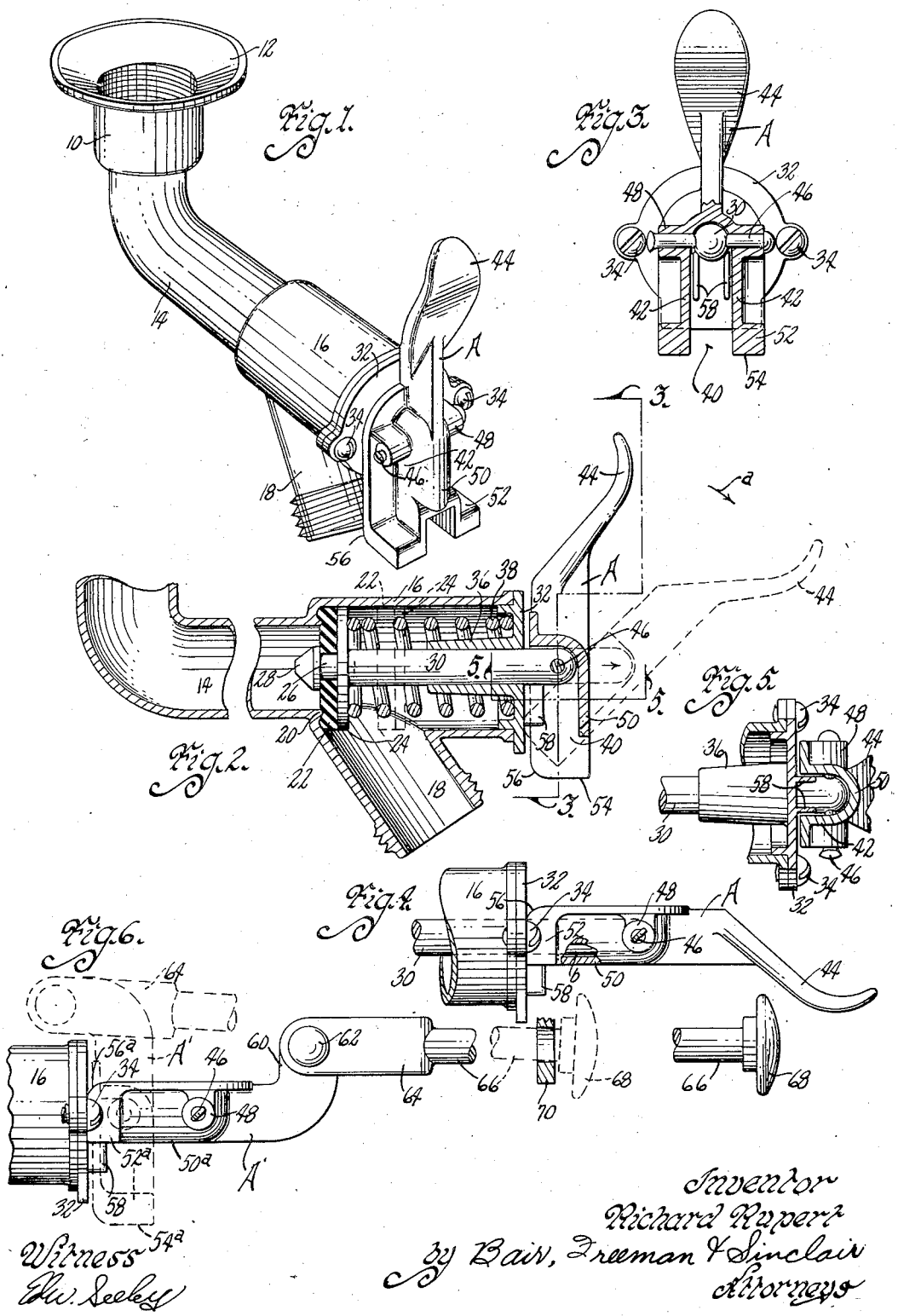
Inventor
Richard Rupert
by Bair, Freeman & Sinclair
Attorneys Patented May 5, 1936

2,039,933

UNITED STATES PATENT OFFICE 2,039,933

AUTOMATIC FAUCET

Richard Rupert, Kansas City, Mo., assignor to Rupert Diecasting & Stamping Corporation, Kansas City, Mo., a corporation of Missouri Application June 18, 1935, Serial No. 27,188

7 Claims. (Cl. 251—132)

The object of my invention is to provide an automatic faucet which is simple, durable and comparatively inexpensive to manufacture.

A further object is to provide a drain faucet especially adapted for washing machines and quickly operable from closed to fully opened position by a single swinging movement of a lever and likewise quickly closeable by a single swinging movement of the lever in the opposite direction.

Still a further object is to provide a faucet which is automatically held in either a tightly closed or a widely open position after being moved from one position to the other by swinging a control lever on the valve.

Another object is to provide a quickly openable and closeable drain faucet the valve thereof being adapted to be closed by spring action and opened by swinging action of a lever, the spring of the faucet being then operable to retain said lever in valve open position, the spring subsequently forcing the valve closed when the lever is moved slightly from its valve open position.

More particularly, it is my object to provide a spring closed valve and a lever for opening it, which lever is pivoted intermediate its ends to the stem of the valve and is movable from one position substantially parallel to a wall of the valve body to another position extending at right angles thereto, the lever during such movement opening the valve against the action of the spring and then being held by the spring in the open position due to the spring holding the end of the lever in engagement with the valve body.

With these and other objects in view my invention consists in the construction, arrangement and combination of the various parts of my device, whereby the objects contemplated are attained, as hereinafter more fully set forth, pointed out in my claims and illustrated in the accompanying drawing, in which:

Figure 1 is a perspective view of an automatic faucet embodying my invention.

Figure 2 is a longitudinal, vertical, sectional view of the same.

Figure 3 is a sectional view on the line 3—3 of Figure 2.

Figure 4 is a side elevation of part of the faucet, showing it in the open position.

Figure 5 is a sectional view on the line 5—5 of Figure 2; and

Figure 6 shows a side elevation of a modified form of the faucet.

On the accompanying drawing, I have used the reference character 10 to indicate a screw threaded end adapted for connection with the drain nipple of a washing machine or with any other pipe fitting or the like. It is internally screw threaded and flanged as at 12, this being the usual washing machine construction, although this end of the device may be modified as required for different installations of the faucet. An elbow 14 extends from the threaded end 10 and terminates in a valve body 16 from which projects a drain spout 18 threaded in the usual manner to be received in a suitable fitting (not shown) on the end of a drain hose.

The elbow 14 constitutes an inlet for the valve body 16 and the spout 18 an outlet. Between the inlet and the outlet a valve seat 20 is formed against which a valve plug or disc 22 is adapted to seat. The disc 22 is of suitable composition and held on against a metallic disc 24 by a shank 26 and a head 28.

A stem 30 extends from the disc 24 through a head plate 32 mounted on the valve body 16 as by screws 34. The plate 32 is provided with an elongated bearing sleeve 36 for the stem 30.

Interposed between the head plate 32 and the disc 24 is a spring 38 provided for the purpose of biasing the valve disc 22 to seated position. Exterior of the plate 32 I provide a lever A for opening and closing the valve. One end thereof has a yoke shaped portion, having a slot 40 and a pair of sides 42. The other end has a handle 44 formed thereon. A pivot pin 46 extends through the outer end of the stem 30 and through a pair of bosses 48 in the sides 42 of the lever A.

The sides 42 are connected by a cross piece 50 whereby, in cross section, the sides and the cross piece are U-shaped. The terminal ends of the sides 42 are thickened as at 52 and their end surfaces are indicated at 54, these being rounded at 56.

Between the arms 42 or within the U-shaped cross sectional part of the lever A, I provide a pair of guide ribs 58 (see Figure 5). These are adapted to prevent rotation of the lever A relative to the valve body about the axis of the stem 30.

In Figure 6 I show a modified construction which is the same as the preceding figures with the exception of the lever indicated at A', which has some parts similar to the preceding figures and given the same reference numerals with the addition of the distinguishing characteristic a. Instead of the handle 44 I have the lever A' provided with a perforated extension 60 in which is mounted a pivot pin 62. Pivoted on the pin 62 is a yoke 64 terminating in a control rod 66. On the outer end of the rod an operating knob 68 is provided.

This type of valve is adapted for mounting back under the tub of a washing machine or at some other remote point, whereas the valve of Figure 1 can be mounted on the bottom of the tub adjacent the peripheral edge thereof.

The rod 66 extends to any convenient point from which to operate the valve, as for instance the edge of the washing machine tub, a suitable bracket partially shown at 70 being provided for slidably mounting the rod, this bracket being attachable to the tub or some other support.

*Practical operation*

With the parts in the position of Figure 2, the spring 38 holds the valve closed, the side of the lever A adjacent the plate 32 being slightly spaced to prevent the lever acting as a stop against the head plate. When it is desired to open the valve, it is merely necessary to swing the handle 44 in the direction of the arrow *a* in Figure 2, which will cause the rounded part 56 to slide along the plate 32 and the lever A to finally assume the position of Figure 4 with the end 54 thereof engaging the head plate 32. This end is substantially at right angles to the length of the lever A and therefore retains the lever in the position of Figure 4 against the action of the spring 38 to close the valve after it has once been opened. A slight swinging of the lever toward closed position however, will permit the rounded corner 56 to slide and roll in contact with the plate 32 whereupon the spring 38 can snap the valve to the closed position. Thus the valve can be quickly opened or closed by a simple swinging motion of the lever 44, or pulling and pushing respectively of the knob 68. The cross piece 50 of the lever engages the side of the stem as indicated at *b* in Figure 4 when the valve is in open position in order to limit the lever A against excessive opening movement as would be the case if the lever were an open yoke instead of having the cross piece 50.

My automatic faucet is especially designed so that it can be formed by the die casting process and the manner of its assembly is quite simple and economical from a manufacturing standpoint.

Some changes may be made in the construction and arrangement of the parts of my device without departing from the real spirit and purpose of my invention and it is my invention to cover by my claims, any modified forms of structure or use of mechanical equivalents, which may be reasonably included within their scope.

I claim as my invention:

1. In an automatic faucet, a valve body having an inlet and an outlet, a valve seat between said inlet and outlet, a valve plug for seating thereagainst, a valve stem connected with said valve plug, spring means to urge said valve plug to seat on said valve seat, a head on said valve body, said stem extending therethrough and means exterior of said head to unseat said valve plug against the tension of said spring comprising a two position elongated lever pivoted intermediate its length to the outer end of said stem, a handle for swinging said lever from one position to the other, said lever in one of said positions lying along the outer end of said head and in its other position extending at substantially right angles thereto with the end thereof resting against the head and held in engagement therewith under the tension of said spring, said lever being U-shaped in a cross section thereof across the minor axis of the lever and adjacent the pivotal connection thereof with said stem, the cross piece of the U-shaped portion engaging the side of said stem to limit movement of the lever towards valve opening position.

2. In an automatic faucet, a valve body, a valve seat therein, a valve plug for seating thereagainst, a valve stem connected with said valve plug, spring means to urge said valve plug to seat on said valve seat, said stem extending through a wall of said valve body and means exterior of said valve body to unseat said valve plug against the tension of said spring comprising a two position elongated lever pivoted intermediate its length to the outer end of said stem, a handle for swinging said lever from one position to the other, said lever in one of said positions lying along said wall and in its other position extending at substantially right angles thereto with the end thereof resting against the wall and held in engagement therewith under the tension of said spring, said lever being U-shaped in a cross section thereof across the minor axis of the lever and adjacent the pivotal connection thereof with said stem, the cross piece of the U-shaped portion engaging the side of said stem to limit movement of the lever toward valve opening position.

3. In an automatic faucet, a valve body having an inlet and an outlet, a valve seat between said inlet and outlet, a valve plug for seating thereagainst, a valve stem connected with said valve plug, spring means to urge said valve plug to seat on said valve seat, a head on said valve body, said stem extending therethrough and means exterior of said head to unseat said valve plug against the tension of said spring comprising a two position elongated lever pivoted intermediate its length to the outer end of said stem, a handle for swinging said lever from one position to the other, said lever in one of said positions lying alone the end of said head and in its other position extending at substantially right angles thereto with the end thereof resting against the head and held in engagement therewith under the tension of said spring, said lever having a slot therein into which said stem extends and means on said head engaging in said slot to guide said lever in its swinging movement and prevent its rotation relative to said head about the axis of said stem.

4. In an automatic faucet, a valve body, a valve seat therein, a valve plug for seating thereagainst, a valve stem connected with said valve plug, spring means to urge said valve plug to seat on said valve seat, said stem extending through a wall of said valve body and means exterior of said wall to unseat said valve plug against the tension of said spring comprising a two position elongated lever pivoted intermediate its length to the outer end of said stem, a handle for swinging said lever from one position to the other, said lever in one of said positions lying along said wall and in its other position extending at substantially right angles thereto with the end thereof resting against the wall and held in engagement therewith under the tension of said spring, said lever having a portion U-shaped in cross section adjacent the pivotal connection thereof with said stem, the cross piece of the U-shaped portion engageable with the side of said stem to limit movement of the lever toward valve opening position, and means on said wall engaging between the sides of the U-shaped portion of said lever to guide said lever in its swinging movement and prevent its rotation relative to said head about the axis of said stem.

5. In an automatic faucet, a valve body having an inlet and an outlet, a valve seat between said inlet and said outlet, a valve plug for seating thereagainst, a valve stem connected with said valve plug and projecting through a wall of said valve body, means biasing said valve plug to seated position against said valve seat and means exterior of said valve body to unseat said valve plug against the action of the biasing means comprising a two position elongated lever pivoted intermediate its length to the outer end of said stem, a handle for swinging said lever from one position to the other, said lever in one of said positions lying alongside said wall of the valve body and in its other position extending at an angle thereto, the end of said lever when extending at such angle engaging a substantial area of said wall adjacent said valve stem and held in engagement therewith by the biasing means against the action thereof to close the valve, said lever having a slot therein into which said stem extends and means on said wall engaging in said slot to guide said lever in its swinging movement and prevent its rotation relative to said wall about the axis of said stem.

6. In an automatic faucet, a valve body having an inlet and an outlet, a valve seat between said inlet and said outlet, a valve plug for seating thereagainst, a valve stem connected with said valve plug and projecting through a wall of said valve body, means biasing said valve plug to seated position against said valve seat and means exterior of said valve body to unseat said valve plug against the action of the biasing means comprising a two position elongated lever pivoted intermediate its length to the outer end of said stem, a handle for swinging said lever from one position to the other, said lever in one of said positions lying alongside said wall of the valve body and in its other position extending at an angle thereto, the end of said lever when extending at such angle engaging a substantial area of said wall adjacent said valve stem and held in engagement therewith by the biasing means against the action thereof to close the valve, said lever having a portion engageable with the side of said stem to limit movement of the lever toward valve opening position and having a slot therein into which said stem extends and means on said wall engaging in said slot to guide said lever in its swinging movement and prevent its rotation relative to said wall about the axis of said stem.

7. In an automatic faucet, a valve body, a valve seat therein, a valve plug for seating thereagainst, a valve stem connected with said valve plug, resilient means to urge said valve plug to seat on said valve seat, said stem extending through a wall of said valve body, and means exterior of said valve body to unseat said valve plug, against the tension of said means comprising a two-position lever, a handle for swinging said lever from one position to the other, said lever having a slot therein into which said stem extends, and means on said wall engaging in said slot to guide said lever in its movement from one position to the other and prevent its rotation relative to said valve body about the axis of said stem.

RICHARD RUPERT.